May 11, 1954     T. A. HARRIS     2,678,004
CONTROL MEANS FOR LIQUID FUEL PUMPS
Filed Aug. 21, 1950
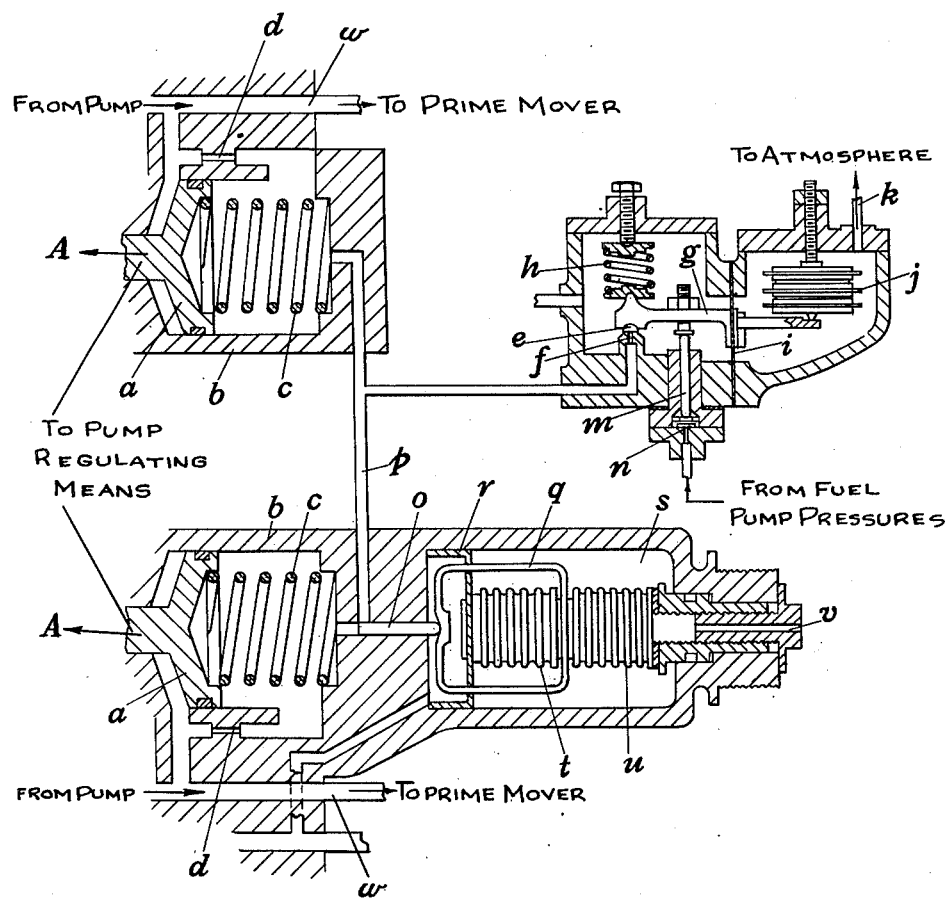
Inventor
T. A. Harris Patented May 11, 1954

2,678,004

UNITED STATES PATENT OFFICE 2,678,004

CONTROL MEANS FOR LIQUID FUEL PUMPS

Thomas Alfred Harris, Edgbaston, Birmingham, England, assignor to Joseph Lucas Limited, Birmingham, England Application August 21, 1950, Serial No. 180,652

Claims priority, application Great Britain September 5, 1949

3 Claims. (Cl. 103—38)

This invention relates to liquid operated servo-mechanisms employed for controlling the variable-delivery liquid fuel pumps of jet engines, gas turbines and like prime movers. In some systems, two or more of such mechanisms (each associated with a pump) are placed under the control of a common but separately arranged controlling means. In the event of accidental injury to such a system, rendering the control means ineffective, each pump would automatically assume a condition of minimum delivery, and as this condition might be dangerous (in the case of an engine on an aircraft) the device has already been employed of arranging an automatic isolating valve in association with each servo-mechanism so that in the event of failure of the controlling means, the pump can assume automatically a condition of maximum delivery. This device has, however, been found to be unsatisfactory for the reason that when flying at an altitude the engine may be supplied with an undesirable excess of fuel. There remains, therefore, a need for enabling the pumps (or at least one of them) in the event of failure of the normal controlling means to continue to operate under an automatically variable control which is susceptible to changes of atmospheric pressure, and the object of the present invention is to provide a satisfactory means for meeting this requirement.

The accompanying drawing illustrates diagrammatically one embodiment of the invention.

In the example shown, each of two or more servo-mechanisms comprises a piston $a$ slidable in a cylinder $b$, and loaded by a spring $c$, the piston being connected to the pump-output regulating means, such as the swash-plate of a swash-plate type pump. The two ends of the cylinder are in communication through a restricted orifice $d$, and the common controlling means above mentioned consists of a valve $e$ which controls a vent $f$ in communication with the discharge end of each of the servo-cylinders. Movement of either of the pistons $a$ in the direction of the arrows A increases the pump output.

The valve $e$ may be operable by any of several variable fluid pressures associated with the normal working condition of the prime mover. In the example shown, the valve is carried by a lever $g$ loaded by a spring $h$. The lever is carried by a flexible diaphragm $i$. At one end the lever is acted on by an evacuated elastic capsule $j$ contained in a chamber which is open to the atmosphere at $k$. Another part of the lever is acted on by a plunger $m$ subject to the fuel delivery pressure acting on a piston $n$. The arrangement is such that when the valve $e$ is closed, the pressures of the liquid supplied by the pumps through pipe lines $w$ and acting on opposite sides of the pistons $a$, $a$ are balanced, and the springs $c$ then move the pistons in the direction for obtaining maximum fuel output from the pumps. When the valve $e$ is opened, liquid can escape through the vent $f$, and the preponderating liquid pressures acting on the left-hand sides of the pistons then move the latter in opposition to the springs for reducing the output of the pumps.

In applying the present invention to such a system, there is provided in association with at least one of the servo-mechanisms, an isolating valve. This comprises a slidable plunger $o$ adapted to intercept the passage $p$ leading from one end of one of the cylinders $b$ to the vent $f$. The plunger $o$ bears at one end on a yoke piece $q$ which is supported by a piston $r$ slidable in a cylindrical chamber $s$ formed on or secured to one of the servo cylinders $b$. In this chamber are contained a pair of coaxial elastic capsules $t$, $u$. The capsule $t$ is evacuated, and the capsule $u$ is open to the atmosphere through an orifice $v$. One end of the yoke piece $q$ is secured between the adjacent ends of the capsules, the other end serving as an abutment for the plunger $o$.

The arrangement is such that under normal working conditions, the associated pumps and servo-mechanisms are controlled by the common controlling valve $e$, and the pressure of the liquid in the discharge end of the servo-cylinder $b$ which is provided with the isolating valve $o$ is sufficient to move this valve to the position in which there is free communication between this servo-cylinder and the control valve $e$. But in the event of fracture of an associated pipe, or other injury causing the valve $e$ to be rendered inoperative such that it is unable to close the vent $f$, the valve $o$ will move under the combined action of the fall in pressure in the line $p$ and the force exerted by the elastic capsules $t$ and $n$ to the position in which it isolates or nearly isolates the associated servo-cylinder from the said controlling means. This isolation or partial isolation is necessary since otherwise in the above circumstances each pump would automatically assume a condition of minimum delivery which might be dangerous as in the case of an engine in an aircraft. The isolated pump, however, continues to supply fuel at or near its maximum delivery. With high barometric pressure, as at sea level, the isolation may be complete, but at altitude and relatively low atmospheric pressure, the liquid pressure in the discharge end of the servo-cylinder will preponderate sufficiently to effect partial opening of the valve o and so allow an escape of liquid, with consequent reduction of the pump output. In this way and by appropriate adjustment of the isolating valve the latter can effect a desirable control of pump output in response to variations of atmospheric pressure.

In the example illustrated, only one of the servo-mechanisms is provided with the isolating valve, as a single pump is usually sufficient to maintain the required supply of fuel to the engine in the event of an emergency. But if desired an isolating valve with controlling means responsive to atmospheric pressure may be provided in association with each of the servo-mechanisms.

Having thus described my invention what I claim as new and desire to secure by Letters Patent is:

1. In a liquid fuel supply system including a plurality of fuel pumps, a liquid operated servo-mechanism associated with each pump for regulating the rate of supply of fuel by the pump and operated by the pressure of fuel supplied by said pump, a common controlling valve for releasing liquid fuel from the servo-mechanisms to thereby effect a reduction in the outputs of the pumps, at least one isolating valve arranged in the communication between the said controlling valve and one of the servo-mechanisms, means operable by the liquid fuel pressure in the last mentioned servo-mechanism for urging the said isolating valve to open position whereby said valve is normally held open, and means responsive to atmospheric pressure for urging the said isolating valve towards closed position, whereby in the event of the controlling valve failing to close the isolating valve will be wholly or partially closed depending upon the magnitude of the atmospheric pressure.

2. In a liquid fuel supply system including a plurality of fuel pumps, a liquid operated servo-mechanism associated with each pump for regulating the pump output and operated by the pressure of fuel supplied by the said pump, a common controlling valve for releasing liquid fuel from the servo-mechanisms to thereby effect a reduction in the outputs of the pumps, at least one isolating valve arranged in the communication between the said controlling valve and one of the servo-mechanisms and having one of its ends exposed to liquid fuel pressure in the last-mentioned servo-mechanism for urging said isolating valve to open position whereby said valve is normally held open, and means responsive to atmospheric pressure for urging the said isolating valve towards closed position, whereby in the event of the controlling valve failing to close the isolating valve will be wholly or partially closed depending upon the magnitude of the atmospheric pressure.

3. In a liquid fuel supply system including a plurality of fuel pumps, a liquid operated servo-mechanism associated with each pump for regulating the pump output and operated by the pressure of fuel supplied by the said pump, a common controlling valve for releasing liquid fuel from the servo-mechanisms to thereby effect a reduction in the outputs of the pumps, at least one isolating valve comprising a plunger arranged in the communication between the said controlling valve and one of the servo-mechanisms and having a plunger end exposed to liquid fuel pressure in the last-mentioned servo-mechanism for urging said plunger to open position whereby said isolating valve is normally held open, a pair of coaxially arranged and connected elastic capsules, one of which is evacuated and the other of which is open to atmospheric pressure and constituting a means responsive to variations in atmospheric pressure, and a yoke piece connected at one end to the adjacent connected ends of the capsules and having at its other end an operative connection with the end of the plunger remote from that exposed to the fuel pressure for urging the plunger towards closed position, whereby in the event of the controlling valve failing to close the isolating plunger will be wholly or partially closed depending upon the magnitude of the atmospheric pressure.

References Cited in the file of this patent

UNITED STATES PATENTS

| Number | Name | Date |
|---|---|---|
| 2,514,674 | Schorn | July 11, 1950 |
| 2,517,313 | Hooker et al. | Aug. 1, 1950 |
| 2,594,790 | Morley | Apr. 29, 1952 |